United States Patent [19]

Logan et al.

[11] 4,297,292

[45] Oct. 27, 1981

[54] FRACTIONATION OF TRIGLYCERIDE MIXTURES

[75] Inventors: Ted J. Logan, Cincinnati; Timothy A. Lubsen, Worthington, both of Ohio

[73] Assignee: The Procter & Gamble Company, Cincinnati, Ohio

[21] Appl. No.: 134,029

[22] Filed: Mar. 26, 1980

Related U.S. Application Data

[63] Continuation-in-part of Ser. No. 43,394, May 25, 1979, abandoned.

[51] Int. Cl.$^3$ .............................................. C09F 5/10

[52] U.S. Cl. ................................ 260/428.5; 560/248

[58] Field of Search .................... 260/428.5; 560/191, 560/218, 248

[56] References Cited

U.S. PATENT DOCUMENTS 2,985,589 5/1961 Broughton .......................... 210/34

3,409,691 11/1968 Smad ................................ 260/676

4,189,442 2/1980 Lubsen ........................... 260/428.5

OTHER PUBLICATIONS

Derwent Abst. 60592B/33 of Jap. Pat. Appl. 54/084519 (Kagakuhin Kensa Kyo) 7/7/79.

JAOCS, vol. 42, pp. 9-14, Jurriens et al.

Leben. Wiss. Tech. vol. 10, No. 6, pp. 328-331.

Chemistry and Industry 24, pp. 1049-1051, 6/16/62.

JAOCS 41, pp. 403-406 (Jun. 1964).

J. LiP. Res. 7, pp. 717-732 (Nov. 1966).

*Primary Examiner*—John F. Niebling

*Attorney, Agent, or Firm*—Ronald L. Hemingway; Richard C. Witte

[57] ABSTRACT

Triglyceride mixture is fractionated to obtain product(s) of Iodine Value different from that of such mixture utilizing particular resin adsorbent and particular solvent.

17 Claims, No Drawings

FRACTIONATION OF TRIGLYCERIDE MIXTURES

CROSS-REFERENCE TO RELATED APPLICATION

This is a Continuation-in-Part of application No. 043,394 filed May 25, 1979, and now abandoned.

BACKGROUND OF THE INVENTION

The field of the invention is the separation of triglyceride mixture to obtain product (s) of Iodine Value different from that of such mixture.

The invention is especially useful in the processing of soybean oil to reduce the content of triglyceride with linolenic acid moiety to minimize the development of rancidity and odor. Such processing is presently being carried out commercially by touch hydrogenating in the presence of a nickel catalyst to convert linolenic acid moiety to more saturated moiety. Touch hydrogenating is disadvantageous for a number of reasons. Special processing is required to remove catalyst and hydrogenation odor. Moreover, touch hydrogenation causes undesired cis to trans isomerization and double bond position changes.

It is an object of this invention to provide a novel process for fractionating triglyceride mixtures.

It is an object in an important application of this invention to provide a process for reducing the content of linolenic acid moiety in soybean oil and minimize rancidity and odor problems without the need to remove catalyst or hydrogenation odor and without cis to trans isomerization or double bond position changes.

BRIEF DESCRIPTION OF THE INVENTION

The above objects and other objects and advantages are obtained as follows: The feed, triglyceride mixture to be separated into fractions of higher Iodine Value and lower Iodine Value, is dissolved in particular solvent. The solution which is formed is contacted with particular resin adsorbent. Triglyceride of higher Iodine Value is selectively adsorbed on such adsorbent, and a fraction of the mixture which is enriched (compared to the feed) in content of triglyceride of lower Iodine Value is left in the solution. Solution of the fraction which is enriched in content of triglyceride of lower Iodine Value is removed from contact with the resin which has selectively adsorbed triglyceride of higher Iodine Value; this solution is denoted a raffinate. Fraction enriched in content of triglyceride of lower Iodine Value can readily be recovered from the raffinate as described later. The resin which has selectively adsorbed thereon triglyceride of higher Iodine Value is contacted with particular solvent to cause desorption of adsorbed triglyceride and provide a solution in the solvent of fraction enriched (compared to the feed) in content of triglyceride of higher Iodine Value. Solution in solvent of fraction enriched in content of triglyceride of higher Iodine Value is removed from contact with the resin which has undergone desorption of triglyceride; this solution is denoted an extract. Fraction enriched in content of triglyceride of higher Iodine Value can be readily recovered from the extract as described later.

Preferred is a process where the solvent which is used to dissolve feed for selective adsorption (that is, the adsorption vehicle), and the solvent which is used as the vehicle for desorption (that is, the desorbent) have the same composition. Such process is conveniently referred to herein as a one solvent process. Preferably, such one solvent process is carried out continuously utilizing a simulated moving bed unit operation.

Less preferred is a process where the solvent which is used as the dissolving phase during adsorption and the solvent which is used as the vehicle for desorption have different compositions. This process is conveniently referred to herein as a two solvent process.

In general, the solvent (s) utilized herein (whether in a one solvent process or in a two solvent process) is (are) characterized by a solubility parameter (on a 25° C. basis) ranging from about 7.0 to about 15.0, a solubility parameter dispersion component (on a 25° C. basis) ranging from about 7.0 to about 9.0, a solubility parameter polar component (on a 25° C. basis) ranging from 0 to about 6.0 and a solubility parameter hydrogen bonding component (on a 25° C. basis) ranging from 0 to about 11.5. Solvents which are of low or moderate polarity do not have the disadvantage of high polarity solvents of attacking the resin adsorbent thereby destroying such adsorbent or shortening its life.

The resin adsorbents useful in the invention generally described above are macroreticular strong acid cation exchange resins having exchangeable cation substituents consisting essentially of from about 3% to 100% of metal cation substituents capable of forming $\pi$-complexes (hereinafter "$\pi$-complexing substituents"), the balance being metal ions incapable of forming $\pi$-complexes.

The solvent(s) (that is, the adsorption vehicle and the desorbent, whether in a one solvent process or a two solvent process) and the percentage of $\pi$-complexing substituents in the resin adsorbent are selected to provide selectivity during adsorption and satisfactory desorption of adsorbed triglyceride. The selection of the solvent(s) and $\pi$-complexing substituent percentage are interrelated and depend on the separation desired to be obtained. The higher the $\pi$-complexing substituent percentage is, the greater the adsorbing power and the greater the resistance to desorption. The lower the solubility parameter and solubility parameter polar and hydrogen bonding components of the solvent utilized as the dissolving phase during adsorption are, the more the adsorbing power for a given $\pi$-complexing substituent percentage. The higher the solubility parameter and solubility parameter polar and hydrogen bonding components of the solvent utilized as the vehicle for desorption are, the more the desorbing power. The higher the Iodine Value of the triglyceride fraction desired to be separated is, the higher the solubility parameter and solubility parameter polar and hydrogen bonding components of the solvent that can be used for adsorbing and that is required for desorbing and the lower the $\pi$-complexing substituent percentage of the resin that can be used for adsorbing and which will allow desorbing. When a particular resin and $\pi$-complexing substituent percentage has been selected, the solvent used during adsorbing should have a solubility parameter and solubility parameter components sufficiently low to obtain selectivity, and the solvent used for desorbing should have a solubility parameter and solubility parameter components sufficiently high to obtain desorption. When a particular solvent or solvents have been selected, the percentage of $\pi$-complexing substituents is selected so as to be sufficiently high to provide desired selectivity during adsorption and sufficiently low to allow desorption of adsorbed triglyceride during the desorbing step.

One embodiment of this invention relates to removing an undesirable higher Iodine Value fraction from a feedstock. A very important application of this embodiment is the treatment of soybean oil; as mentioned above, this involves fractionating to reduce the content of linolenic acid moiety in soybean oil.

Another embodiment of this invention involves recovering a particular desired higher or lower Iodine Value fraction. Important applications of this embodiment are the recovery of increased trilinolein level composition from regular safflower oil and the recovery of increased triolein level composition from high oleic safflower oil. Trilinolein is an excellent drying oil. Triolein is an excellent frying oil.

Still another embodiment involves obtaining particular Iodine Value cuts for any special purpose.

The invention herein contemplates one stage processing as well as processing in a plurality of stages. One stage processing is suitable for separating a mixture into two fractions. Multistage processing is suitable for separating a mixture into more than two fractions.

As used herein, the term "selectively" in the phrase "selectively adsorb" describes the ability of the adsorbent to preferentially adsorb a component or components. In practice, the component(s) which is (are) preferentially adsorbed, is (are) rarely ever the only component(s) adsorbed. For example, if the feed contains one part of a first component and one part of a second component, and 0.8 parts of the first component and 0.2 parts of the second component are adsorbed, the first component is selectively adsorbed. The degree of magnitude of the selective adsorption is expressed herein in terms of relative selectivity, that is, the ratio of two components of the adsorbed phase (extract) divided by the ratio of the same two components in the unadsorbed phase (raffinate). In other words, relative selectivity as used herein is defined by the following equation:

$$\text{Selectivity} = \frac{[\text{Concentration } M/\text{Concentration } N]_A}{[\text{Concentration } M/\text{Concentration } N]_U}$$

where M and N are two components of the feed represented in volume or weight percent and the subscripts A and U represent the adsorbed and unadsorbed phases respectively. When the Selectivity is 1.0, there is no preferential adsorption of one component over the other. A selectivity larger than 1.0 indicates preferential adsorption of component M; in other words, the extract phase is enriched in M and the raffinate phase is enriched in N. The farther removed the selectivity is from 1.0, the more complete the separation.

The meaning of the terms "triglyceride of higher Iodine Value" and "triglyceride of lower Iodine Value" as used herein depends on the context of the application of the invention. The "triglyceride of higher Iodine Value" has to include the triglyceride of highest Iodine Value, and the "triglyceride of lower Iodine Value" has to include triglyceride with all fatty acid moieties having saturated carbon chains (referred to herein as saturated triglycerides) if such is present in the mixture being separated. The important point is that the separation is one on the basis of Iodine Value.

The term "Iodine Value" is used in its normal meaning in relation to degree of unsaturation of fats and is described fully in Swern, *Bailey's Industrial Oil and Fat Products,* Interscience, 3rd edition, pages 63 and 64.

The composition of triglyceride mixtures is sometimes referred to herein as containing a percentage of particular fatty acid moiety "on a fatty methyl ester basis". Such percentages are obtained by determining the weight percentage of a particular methyl ester in the methyl ester mixture obtained by converting triglyceride fatty acid moieties into corresponding methyl esters. Thus, for example, a triglyceride mixture containing 7% linolenic acid moiety on a fatty acid methyl ester basis means that the methyl ester mixture obtained on converting the fatty acid moieties of such triglyceride mixture contains by weight 7% methyl linolenate.

The term "solvent" as used herein refers both to solvent blends (i.e., solvents consisting of a plurality of constituents) and to pure compounds (i.e., solvents consisting of a single constituent) unless the context indicates otherwise.

The terms "solubility parameter", "solubility parameter dispersion component", "solubility parameter polar component" and "solubility parameter hydrogen bonding component" as used herein are defined by equations 6–10 at page 891 of Kirk-Othmer, *Encyclopedia of Chemical Technology,* 2nd edition, Supplement Volume, published by Interscience Publishers (John Wiley & Sons), New York, 1971. Values herein for solubility parameter, solubility parameter dispersion component, solubility parameter polar component and solubility parameter hydrogen bonding component are for solvents at 25° C. (i.e., they are on a 25° C. basis). As at page 891, the symbols "$\delta$", "$\delta_D$", "$\delta_P$", and "$\delta_H$" are used herein to refer respectively to "solubility parameter", "solubility parameter dispersion component", "solubility parameter polar component", and "solubility parameter hydrogen bonding component". For many solvents the values for $\delta_D$, $\delta_P$ and $\delta_H$ are given in Table I which directly follows page 891 and the value for $\delta$ is calculated using equation (6) on page 891. For solvents consisting of a plurality of constituents, the values for "$\delta_D$", "$\delta_P$", and "$\delta_H$" are calculated by summing the corresponding values for the constituents multiplied by their volume fractions and the value for "$\delta$" is calculated using equation (6) on page 891.

The term "cation substituents" means the exchangeable cations associated with the adsorbent. The "cation substituents capable of forming $\pi$-complexes" are cation substituents capable of attracting and holding unsaturated materials (the greater the degree of unsaturation, the greater the attracting and holding power) by formation of a particular kind of chemisorption bonding known as $\pi$-bonding. The "cation substituents not capable of forming $\pi$ complexes" do not have significant ability to form such chemisorption bonds. The formation of $\pi$ complexes is considered to involve two kinds of bonding: (1) overlap between occupied $\pi$ molecular orbital of an unsaturate and an unoccupied d orbital or dsp-hybrid orbital of a metal and (2) overlap between an unoccupied antibonding $\pi^*$ molecular orbital of the unsaturate and one of the occupied metal d or dsp-hybrid orbitals (sometimes referred to as "back bonding"). This $\pi$ complexing is described, for example, in Chem. Revs. 68, pp. 785–806(1968). Examples of metal cation substituents which form $\pi$ complexes are: silver, rhodium and copper in a valence state of one and platinum, palladium and ruthenium in a valence state of two.

The percentages of cationic substituents in a resin are percentages of total ion exchange capacity. Thus a resin having its exchangeable cation substituents consisting of 50% $\pi$-complexing substituents and 50% non $\pi$-complexing substituents (e.g. alkali metal substituents) has 50% of its ion exchange capacity being taken up by $\pi$-complexing substituents and 50% of its ion exchange capacity being taken up by non $\pi$-complexing substituents.

DETAILED DESCRIPTION

Triglyceride mixture which is to be separated according to the present process, that is the feed (sometimes referred to as feedstock), contains triglycerides with different Iodine Values. In other words, the feed is a mixture of triglyceride of higher Iodine Value with triglyceride of lower Iodine Value.

The triglycerides in the feed have the formula

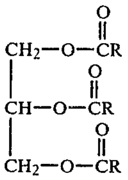

in which each R is aliphatic chain which contains 5 to 25 carbon atoms and is the same or different within a molecule. Thus, the triglycerides in the mixture have carboxylic acid moieties which contain carbon chains containing 6 to 26 carbon atoms. The aliphatic chains can be saturated or unsaturated. The unsaturated aliphatic chains are usually mono-, di- or triunsaturated.

Triglyceride mixtures for feed into a one stage process or into the first stage of a multistage process can be or are readily derived from naturally occurring fats and oils such as, for example, butter, corn oil, cottonseed oil, lard, linseed oil, olive oil, palm oil, palm kernel oil, peanut oil, rapeseed oil, safflower oil, (both regular and high oleic), sardine oil, sesame oil, soybean oil, sunflower oil and tallow. A very important feedstock is soybean oil containing from about 6.5% to about 8.5% by weight of linolenic acid moiety on a fatty methyl ester basis and having an Iodine Value ranging from about 130 to about 150.

Preferably, the triglyceride feedstock is essentially free of impurities such as gums, free fatty acids, mono- and diglycerides, color bodies, odor bodies, etc., which can foul the adsorbent and cause loss of performance. The clean-up of the feedstock is accomplished by numerous techniques known in the art, such as alkali refining, bleaching with Fuller's Earth or other active adsorbents, vacuum-steam stripping to remove odor bodies, etc. The soybean oil feedstock referred to above is preferably refined, bleached and deodorized.

In a one solvent continuous process, the feed is usually introduced into the adsorbing unit without solvent and is dissolved in solvent already in the unit, introduced, for example, in a previous cycle to cause desorption. If desired, however, the feed in a one solvent process can be dissolved in solvent prior to introducion into the adsorbing unit or the feed can be raffinate from a previous stage comprising triglyceride mixture dissolved in solvent. In a two solvent process, the feed is preferably dissolved in the solvent constituting the vehicle for adsorption prior to introduction into the adsorbing unit.

Turning now to the solvents useful herein for a one solvent process (where the same solvent composition performs the dual role of being the dissolving phase during adsorption and the vehicle for desorption), these are preferably characterized by $\delta$ ranging from about 7.0 to about 10.5, $\delta_D$ ranging from about 7.0 to about 9.0, $\delta_P$ ranging from about 0.2 to about 5.1 and $\delta_H$ ranging from about 0.3 to about 7.4. More preferred solvents for use in a one solvent process herein are characterized by $\delta$ ranging from about 7.4 to about 9.0 (preferably from about 7.5 to about 9.0), $\delta_D$ ranging from about 7.25 to about 8.0, $\delta_P$ ranging from about 0.5 to about 3.0 (most preferably from about 1.0 to about 3.0) and $\delta_H$ ranging from about 0.7 to about 4.0 (most preferably from about 1.0 to about 4.0).

One important group of solvents for a one solvent process is that consisting essentially by volume of from 0% to about 90% $C_5$–$C_{10}$ saturated hydrocarbon (that is, hydrocarbon with from 5 to 10 carbon atoms) and from 100% to about 10% carbonyl group containing compound selected from the group consisting of (a) ester having the formula

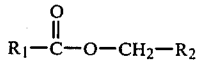

wherein $R_1$ is hydrogen or alkyl chain containing one or two carbon atoms and $R_2$ is hydrogen or alkyl chain containing one to three carbon atoms and (b) ketone having the formula

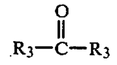

wherein each $R_3$ is the same or different and is alkyl chain containing 1 to 5 carbon atoms. Examples of suitable hydrocarbons are pentane, hexane, heptane, octane, nonane, decane. Examples of esters suitable for use in or as the solvent are methyl formate, methyl acetate, ethyl acetate, methyl propionate, propyl formate and butyl formate. Examples of ketones suitable for use in or as the solvent are acetone, methyl ethyl ketone, methyl isobutyl ketone and diethyl ketone. Esters are preferred to ketones because of better compatibility with the adsorbent.

Preferably unsaturated hydrocarbons and aromatic hydrocarbons should not be used since they tend to compete for adsorption sites on the adsorbent. Also, it is preferred to avoid use of halogenated hydrocarbon solvents as these shorten adsorbent life.

Another important group of solvents for a one solvent process is dialkyl ethers containing 1 to 3 carbon atoms in each alkyl group and blends of these with the hydrocarbon, ester and ketone solvents set forth above. Specific examples of solvents within this group are diethyl ether and diisopropyl ether.

Yet another important group of solvents for a one solvent process is blends of $C_{1\text{-}3}$ alcohols (e.g. from about 5% to about 35% by volume alcohol) with the hydrocarbon, ester and ketone solvents set forth above. Specific examples of solvents within this group are blends of methanol or ethanol with hexane.

In most continuous one solvent processes envisioned within the scope of this invention, the solvent is introduced into the process in a desorbing zone and sufficient solvent remains in the process to perform at a downstream location the dissolving function for adsorption.

The solvent to feed ratio for a one solvent process generally ranges on a volume basis from about 4:1 to about 100:1 and preferably ranges from about 5:1 to about 30:1.

We turn now to the solvents useful herein for a two solvent process (where different solvent compositions are used as the dissolving phase during adsorption and as the vehicle for desorption).

For a two solvent process herein, the solvents for use as the dissolving adsorption, i.e., as the adsorption vehicle, are preferably characterized by $\delta$ ranging from about 7.3 to about 14.9, $\delta_D$ ranging from about 7.3 to about 9.0, $\delta_P$ ranging from 0 to about 5.7 and $\delta_H$ ranging from 0 to about 11.0. More preferred solvents for the adsorption vehicle for a two solvent process herein are characterized by $\delta$ ranging from about 7.3 to about 9.0, $\delta_D$ ranging from about 7.3 to about 8.0, $\delta_P$ ranging from 0 to about 2.7 and $\delta_H$ ranging from 0 to about 3.6. Very preferably, the solvent for the adsorption vehicle herein is hexane or a blend consisting essentially of hexane and up to about 15% by volume ethyl acetate or diisopropyl ether or of hexane and up to about 10% by volume of acetone.

For a two solvent process herein, the solvents for use as the vehicle for desorption, i.e. as the desorbent, are preferably characterized by $\delta$ ranging from about 7.4 to about 15.0 and at least 0.1 greater than the $\delta$ of the adsorption vehicle, $\delta_D$ ranging from about 7.3 to about 9.0, $\delta_P$ ranging from about 0.3 to about 6.0 and at least 0.3 greater than the $\delta_P$ of the adsorption vehicle, and $\delta_H$ ranging from about 0.5 to about 11.5 and at least 0.5 greater than the $\delta_H$ of the adsorption vehicle. More preferred solvents for the desorbent for a two solvent process herein are characterized by $\delta$ ranging from about 7.4 to about 10.0, $\delta_D$ ranging from about 7.3 to about 8.0, $\delta_P$ ranging from about 0.5 to about 4.0 and $\delta_H$ ranging from about 0.5 to about 6.0 and having $\delta$, $\delta_P$ and $\delta_H$ respectively greater than the $\delta$, $\delta_P$ and $\delta_H$ of the adsorption vehicle by at least the amounts stated above. Important desorbents for use in a two solvent process herein include:ethyl acetate; blends consisting essentially of ethyl acetate and up to about 80% by volume hexane; blends consisting essentially of ethyl acetate and up to about 25% by volume methanol; diisopropyl ether; blends consisting essentially of diisopropyl ether and up to about 50% by volume hexane.

We turn now to the adsorbent for use herein which is defined the same regardless of whether it is used in a one solvent process or in a two solvent process.

The resin used as adsorbent herein has a matrix obtained by polymerizing styrene and divinyl benzene monomers and then sulfonating. The resin is highly cross-linked. It is macroporous and has a high surface area (surface areas are greater than 20 $m^2/gm$ and usually are in the range of 250–1000 $m^2/gm$). Typical resins which can be obtained commercially for conversion into the absorbents useful herein have ion exchange capacities ranging from about 3 to about 6 milliequivalents per gram (dry basis) and are sold under the tradenames such as Amberlyst 15, Amberlyst XN1005 and Amberlyst XN1010 (all available from Rohm & Haas) and MSC-1 (available from Dow Chemical).

As indicated hereinbefore, resin useful as adsorbent herein has it exchangeable cation substituents consisting essentially of (a) all $\pi$-complexing substituents or (b) combinations of $\pi$-complexing substituents and non $\pi$-complexing substituents. Preferred $\pi$-complexing substituents are cooper and silver in a valence state of one; platinum and palladium in a valence state of two; silver is most preferred. Preferably, the exchangeable cation substituents which are non $\pi$-complexing substituents are sodium and potassium in a valence state of one and calcium, barium magnesium in a valence state of two; sodium is most preferred. The most preferred resin adsorbent has silver as its $\pi$-complexing substituent and sodium as the remaining exchangeable cation substituent.

As previously indicated, the resin adsorbent has its exchangeable cation substituents consisting essentially of from about 3% to 100% $\pi$-complexing substituents and the remainder, if any, alkali metal and/or alkaline earth metal substituents with the percentages being percentages of ion exchange capacity. Preferably, the resin adsorbent has its exchangeable cation substituents consisting essentially of from about 20% to about 60% $\pi$-complexing substituents and the remainder alkali metal and/or alkaline earth metal substituents. Sufficient $\pi$-complexing substituents should be present to cause selective adsorption of the component(s) desired to be adsorbed but not so much that adsorbed component(s) cannot be desorbed.

Examples of specific resins useful herein are Amberlyst XN1010 with 50% silver substitution and 50% sodium substitution, Amberlyst 15 with 100% silver substitution, Amberlyst XN1010 with 25% silver substitution and 75% potassium substitution, Amberlyst XN1005 with 50% copper substitution and 50% potassium substitution, Amberlyst 15 with 50% silver substitution and 50% calcium substitution, Amberlyst XN1010 with 50% copper substitution and 50% sodium substitution and Amberlyst 15 with 50% silver substitution and 50% barium substitution.

The resins useful as adsorbents herein are readily prepared from commercially available macroreticular cation exchange resins (some of which are set forth above). Such preparation simply involves exchange to supply the proper cation substituents. For example, if a 50% silver substituted, 50% sodium substituted resin is desired, hydrogen form resin is first converted to sodium form, for example, by flushing with 10% sodium hydroxide solution and washing, then the sodium form resin is treated with a predetermined amount of silver nitrate in a batch equilibrium soak to introduce the desired percentage of silver; if sodium form resin is commercially obtained, such resin is simply treated with silver nitrate as above to obtain the desired degree of silver substitution.

The resins useful as adsorbents herein generally have particle sizes ranging from 20 mesh to 200 mesh (U.S. Sieve Series). For a continuous process, particle sizes of about 30 mesh to about 80 mesh (U.S. Sieve Series) are preferred; using particle sizes larger than about 30 mesh reduces resolution and causes diffusion (mass transfer) limitations and using particle sizes less than about 80 mesh results in high pressure drops. Usually the particle size used is about the same as that of a commercially obtained resin treated to introduce the selected cationic substituents; in other words, introduction of cationic substituents does not change particle size to any significant extent.

We turn now to the processing conditions of temperature and pressure. The temperatures utilized during adsorbing and during desorbing generally range from about 15° C. to about 120° C. A preferred temperature range to be used when the feed is a mixture of triglycerides having fatty acid moieties with aliphatic chains having from 12 to 20 carbon atoms, is 50° to 80° C. The pressures utilized during adsorbing and desorbing can be the same and generally range from atmospheric (14.7 psia) to about 500 psia. For a simulated moving bed process as described hereafter, the pressures utilized preferably range from about 30 psia to about 120 psia.

For a batch process, sufficient residence time should be provided to get satisfactory yields and purities, usually 15 minutes to 20 hours. The rates for continuous processing are a function of the size of the equipment, the resolving ability of the adsorbent-solvent pair and the desired yield and purity.

The processing herein as described above provides a "raffinate" and an "extract". The raffinate contains fraction which is enriched in content of triglyceride of lower Iodine Value. It comprises triglycerides which were weakly attracted by the adsorbent, dissolved in solvent. The extract comprises fraction enriched in content of triglyceride of higher Iodine Value. It comprises triglycerides which were more strongly attracted by the adsorbent, dissolved in solvent. The fractions of triglyceride can be recovered from the raffinate and from the extract by conventional separation processes such as by stripping solvent with heat, vacuum and/or steam.

We turn now to apparatus for a one solvent process herein.

For batch processing, the one solvent process herein is readily carried out in equipment conventionally used for adsorptions carried out batchwise. For example, such processing can be carried out utilizing a column containing resin adsorbent with intermittent flow of feed and solvent therethrough.

For continuous processing, the one solvent process herein is readily carried out in conventional continuous adsorbing apparatus and is preferably carried out by means of a simulated moving bed unit operation. A simulated moving bed unit operation and apparatus for such useful herein is described in Broughton et al U.S. Pat. No. 2,985,589.

For a simulated moving bed embodiment of this invention, preferred apparatus includes: (a) at least four columns connected in series, each containing a bed of resin; (b) liquid access lines communicating with an inlet line to the first column, with an outlet line from the last column and with the connecting lines between successive columns; (c) a recirculation loop including a variable speed pump, providing communication between the outlet line from last column and the inlet line to the first column; and (d) means to regulate what flows in or out of each liquid access line.

Such preferred simulated moving bed apparatus is operated so that liquid flow is in one direction and so that countercurrent flow of resin is simulated by manipulation of what goes into and out of the liquid access lines. More particularly, the apparatus is operated so that four functional zones are in operation. The first of the functional zones is usually referred to as the adsorption zone. This zone is downstream of a feed inflow and upsteam of a raffinate outflow. In the adsorption zone, there is a net and selective adsorption of triglyceride of higher Iodine Value and a net desorption of solvent and of triglyceride of lower Iodine Value. The second of the functional zones is usually referred to as the purification zone. It is downstream of an extract outflow and upstream of the feed inflow and just upstream of the adsorption zone. In the purification zone, triglyceride of higher Iodine Value which has previously been desorbed is preferentially adsorbed and there is a net desorption of solvent and of triglyceride of lower Iodine Value. The third of the functional zones is referred to as the desorption zone. It is downstream of a solvent inflow and upstream of the extract outflow and just upstream of the purification zone. In the desorption zone, there is a net desorption of triglyceride of higher Iodine Value and a net adsorption of solvent. The fourth functional zone is usually referred to as the buffer zone. It is downstream of the raffinate outflow and upstream of the solvent inflow and just upstream of the desorption zone. In the buffer zone, triglyceride of lower Iodine Value is adsorbed and solvent is desorbed. The various liquid access lines are utilized to provide the feed inflow between the purification and adsorption zones, the raffinate outflow between the adsorption and buffer zones, the solvent inflow between the buffer and desorption zones and the extract outflow between the desorption and purification zones. The liquid flow is manipulated at predetermined time periods and the speed of the pump in the recirculation loop is varied concurrent with such manipulation so that the inlet points (for feed and solvent) and the outlet points (for raffinate and extract) are moved one position in the direction of liquid flow (in a downstream direction) thereby moving the aforedescribed zones in the direction of liquid flow and simulating countercurrent flow of resin adsorbent.

Less preferred continuous simulated moving bed apparatus than described above is the same as the apparatus described above except that only sufficient columns are provided to accommodate adsorption, purification and desorption zones and recirculation means is omitted. Such apparatus is operated with adsorption, purification and desorption zones; the buffer zone is omitted.

In the operation of the above described simulated moving bed processes, the relative number of columns in each zone to optimize a process can be selected based on selectivities and resolution revealed by pulse testing, coupled with capacity and purity requirements. One factor in selecting the number of columns in the adsorpttion zone is the percentage of the feed to be adsorbed. The purity of the extract and raffinate streams is a function of the number of columns in the adsorption zone. The longer the adsorption zone is, (the more columns in it), that is, the further removed the feed inlet is from the raffinate outlet, the purer the raffinate is.

In the operation of the above described simulated moving bed processes, the time interval between manipulations of liquid flow should be sufficient to allow a substantial proportion of triglyceride of higher Iodine Value to stay in the adsorption zone and a substantial proportion of triglyceride of lower Iodine Value to leave.

We turn now to apparatus for the two solvent process herein.

Such two solvent process is preferably carried out using a column loaded with resin. The feed and the solvent constituting the adsorption vehicle are run through the column until a desired amount of feed is adsorbed. Then, the desorbing solvent is run through the column to desorb adsorbed material.

Such two solvent process is less preferably carried out, for example, in a batch mixing tank containing resin adsorbent. The feed together with solvent constituting the adsorption vehicle is added into the tank. Then mixing is carried out until a desired amount of adsorption occurs. Then solvent is drained. Then desorbing solvent is added and mixing is carried out until the desired amount of desorption occurs. Then solvent containing the desorbed triglyceride is drained.

We turn now in more detail to the important process referred to earlier involving soybean oil feed. As indicated earlier the feed is soybean oil (preferably, refined, bleached and deodorized soybean oil) containing from about 6.5% to about 8.5% by weight linolenic acid moiety (on a fatty methyl ester basis) and having an Iodine Value ranging from about 130 to 150. The resin adsorbent for this process is that generally described above but preferably has its exchangeable cation substituents consisting essentially of from about 20% to about 60% silver substituents (valence state of one) with the remainder of the exchangeable cation substituents being sodium substituents (valence state of one). The temperature used during adsorbing and during desorbing preferably ranges from about 50° C. to about 80° C. The processing is preferably carried out continuously in a one solvent process in a simulated moving bed unit operation as described above utilizing a pressure ranging from about 30 psia to about 120 psia. The solvent for a one solvent process is that generally described above for a one solvent process and preferably consists essentially by volume of from about 15% to about 40% hexane with the remainder being ethyl acetate. The raffinate obtained contains triglyceride mixture containing from about 2% to about 5% (or from 0% to about 5%, if desired) of linolenic acid moiety by weight on a fatty methyl ester basis and having an Iodine Value ranging from about 80 to about 125. Product recovered from the raffinate is competitive with touch hardened soybean oil in relation to rancidity and odor problems and avoids entirely the problems associated with touch hardening of processing to remove nickel catalyst and hydrogenation odor and cis to trans isomerization and double bond position changes. In other words, the product obtained from the process of the invention contains no trans double bonds and no double bonds in positions different from those in the feedstock. If desired, the linolenic acid moiety content can be further reduced by a second stage. Fraction obtained from extract is an excellent drying oil.

We turn now in more detail to the multistage processing referred to generally above.

Multistage processing involves the following. The feedstock to be separated is processed in a first stage in the presence of a first resin adsorbent to obtain fraction enriched (compared to the feedstock) in content of triglyceride of higher Iodine Value and first raffinate containing fraction enriched (compared to the feedstock) in content of triglyceride of lower Iodine Value and depleted (compared to the feedstock) in content of triglyceride of higher Iodine Value. The first raffinate, preferably the triglyceride fraction obtained by essentially completely removing solvent from first raffinate, is processed in the second stage in the presence of a second resin adsorbent to obtain fraction enriched in content of triglyceride of higher Iodine Value (compared to the first raffinate) and second fraction or second raffinate enriched (compared to first raffinate) in content of triglyceride of lower Iodine Value and depleted (compared to first raffinate) in content of triglyceride of higher Iodine Value. To the extent succeeding stages are used, each succeeding stage has as its feed raffinate from the preceding stage, preferably triglyceride fraction obtained by essentially completely removing solvent from such raffinate.

The adsorbent here is advantageous over crystalline zeolite adsorbents in relation to triglyceride fractionation in dynamic capacity (i.e. the production rate in continuous operation in apparatus of predetermined size to obtain predetermined purity product(s)). Zeolites have unsatisfactory dynamic capacity, especially in continuous simulated bed unit operation processing.

The invention is illustrated in the following specific examples.

In Examples I-IV below, "pulse tests" are run to determine the quality of separation that can be obtained in one solvent processing for various feeds with selected adsorbents and solvents. The apparatus utilized consists of a column having a length of 120 cm and an inside diameter of 1 cm. which has inlet and outlet ports at its opposite ends. The column is packed with about 60 grams of resin adsorbent (dry basis). The column is in a temperature controlled environment. A constant flow pump is used to pump liquid through the column at a predetermined flow rate. In the conducting of the tests the adsorbent is allowed to come to equilibrium with the particular solvent and feed by passing a mixture of the solvent and feed through the column for a predetermined period of time. The adsorbent is then flushed with the solvent until a 5 milliliter fraction contains no detectable amount of feed. At this time, a pulse of feed containing a known amount of tracer is injected, via a sample coil, into the solvent inflow. The pulse of feed plus tracer is thereby caused to flow through the column with components first being adsorbed by the adsorbent and then caused to be desorbed by the solvent. Equal volume effluent samples are collected, and triglyceride therefrom is converted to methyl ester which is analyzed by gas chromatography. These analytical results are compared to analytical results on a sample of feed converted to methyl ester.

In Example V below, a pilot plant test apparatus or demonstration unit is used. This is apparatus operated according to the continuous simulated moving bed unit operation mentioned above to carry out a one solvent process. The apparatus comprises 24 columns which are connected in series in a loop to permit the process liquid to flow in one direction. Each column has a length of 12 inches and an inside diameter of 9/10 of an inch and is loaded with about 70 grams of resin adsorbent (dry basis). Each column is equipped with a four-position valve connected to two inlet and two outlet conduits. When such valve is closed, liquid flows only toward the next succeeding column. By selecting between the four open positions, feed can be caused to be introduced to the system (e.g. position 1), solvent can be caused to be introduced to the system (e.g. position 2), a raffinate stream can be removed from the system (e.g. position 3), or an extract stream can be removed from the system (e.g. position 4). Backflow control valves are located in the inter-column connectors. These are used to close off two columns from process liquid flow to isolate the high pressure inlet (solvent) from the low pressure outlet to accommodate for no buffer zone being used. The unit is operated in Example V as follows: At any time it constitutes a single stage. It is operated only with the three required working zones (adsorption purification and desorption). In other words, no buffer zone is used and one backflow control valve is always in closed position to close off two columns from the process flow to accommodate for this. No recirculation is used. The 22 columns that are on stream are apportioned between the adsorption, purification and desorption zones with a selected number of columns in series comprising each zone. Feed is introduced into the first column of the adsorption zone and is dissolved in solvent and is contacted with resin adsorbent. As liquid flows downstream through the adsorption zone, triglyceride component(s) of higher Iodine Value is (are) selectively adsorbed leaving raffinate enriched in triglyceride of lower Iodine Value. In the purification zone, nonadsorbed components are forced from the adsorbent and are thus forced downstream toward the feed point. The extract is removed at the inlet to the purification zone and is enriched in adsorbed components. The solvent is added at the inlet to the desorption zone and causes desorption of adsorbed component(s) from the adsorbent for removal downstream at the extract point. At selected intervals a controller advances the flow pattern (into and out of columns) one column (in words, the controller manipulates valves so that raffinate outflow, feed inflow, extract outflow and solvent inflow points each advance one step, that is, to the next liquid access point in the direction of liquid flow) to "step forward" to keep pace with the liquid flow. Twenty-four "steps" constitute a cycle. This "step time" is chosen from pulse test data such as to allow the non-adsorbed components to advance faster than the feed point and reach the raffinate point. The adsorbed triglyceride moves slower than the feed point and falls behind the extract point.

In Examples VI–IX below, a batch equilibrium (that is, static) process is utilized to demonstrate an adsorption step in a two solvent process. The following procedure is used in these examples. A known weight of triglyceride feed mixture is admixed with 5 milliliters of solvent. The resin adsorbent is then placed in a screw-cap vial. The solution containing the triglyceride is then placed in the vial and left in contact with the adsorbent. After a period of time, a one milliliter sample is withdrawn from the clear liquid that is left (not adsorbed). The solvent is evaporated from the one milliliter sample and the triglyceride residue is weighed. The weight which is determined is multiplied by 5 to obtain the total amount of triglyceride which is not adsorbed. The weight of triglyceride adsorbed is calculated by substracting the weight of the triglyceride not adsorbed from the weight of the triglyceride feed. The triglyceride residue after weighing is converted into methyl esters which are analyzed by gas chromatography. The results are compared to an analysis on ester mixture obtained by conversion of a sample of triglyceride starting material to methyl ester.

In Examples X and XI, below, tests are run to demonstrate selection of solvents for a two solvent process once a particular resin adsorbent has been selected. The apparatus utilized is the same as that utilized in the runs of Examples I–IV and as in Examples I–IV, the column is packed with about 60 grams of resin adsorbent (dry basis). In each test, the following procedure is utilized. A plurality of solvents is utilized successively, each being of progressively increasing desorbing power. The initial solvent is pumped through the column at 2 ml/minute with the column temperature being 50° C. 2.0 gms of feed is dissolved in 10 ml. of the initial solvent. Flow through the column is stopped, and the 10 ml. of initial solvent with feed dissolved therein is injected into the column entrance. Flow of initial solvent is then restarted and effluent sample collection is begun. After approximately two column volumes of the initial solvent is pumped into the column, the solvent is changed and approximately two column volumes of the second solvent is pumped into the column. The solvent is successively changed after two column volumes of a solvent is pumped until all the solvents being tested have been pumped into the column. Eluant samples are collected, and the triglyceride therefrom is converted to methyl ester which is analyzed by gas chromatography. From these analyses, elution concentration curves are plotted (concentration of triglyceride component in milligrams per milliliter is plotted on the y axis and elution volume is plotted on the x axis).

We turn now to the Examples I–XI which are generally described above.

EXAMPLE I

The feed was refined, bleached and deodorized soybean oil, which when converted to methyl ester mixture and then analyzed by gas chromatography gives the following composition on a weight basis: methyl palmitate, 10%; methyl stearate, 4%; methyl oleate, 23%; methyl linoleate, 55%; and methyl linolenate, 8%.

The adsorbent used is Amberlyst XN1010 (a macroporous, styrene-divinylbenzene sulfonic acid cation exchange resin manufactured by Rohm & Haas) screened to through 20 and on 40 mesh (U.S. Sieve Series), having its exchangeable cation substituents consisting of 50% silver substituents (valence state of one) and 50% sodium substituents. The resin adsorbent was prepared by screening resin beads to isolate a through 20 and on 40 mesh fraction, converting such fraction to the sodium form by exchange with an excess of sodium hydroxide, then introducing the desired level of silver by equilibrium contact with silver nitrate solution, then drying in a 105° C. air oven for 12–16 hours.

The solvent used consisted by volume of 25% hexane and 75% ethyl acetate. For this solvent blend: $\delta=8.28$, $\delta_D=7.60$, $\delta_P=1.95$ and $\delta_H=2.63$.

The resin adsorbent was dispersed in solvent, allowed to swell, and introduced into the column in swelled form.

The test was run at 70° C.

The solvent was pumped continuously through the column at a rate of 2 ml. per minute. At time zero, a sample pulse of 1 ml., containing approximately 0.075 grams docosane (a linear hydrocarbon tracer) and 0.750 grams soybean oil feed mixture dissolved in the solvent (25/75 hexane/ethyl acetate) was added by means of the sample coil, into the solvent flow. The equal volume samples that were collected were each 5 ml. The effectiveness of the separation is based on the change in percent of each fatty acid moiety in the fractions collected compared with the percent of each fatty acid moiety in the original triglyceride composition. Methyl esters were made of the triglyceride collected in each fraction and the esters were analyzed by gas chromatography. Table I which follows presents the data for this run.

TABLE I

SEPARATION OF SOYBEAN OIL TRIGLYCERIDES ON AMBERLYST XN1010 WITH 50% SILVER SUBSTITUENTS AND 50% SODIUM SUBSTITUENTS BY DEGREE OF UNSTAURATION (SEE NOTE BELOW)

| Elution Volume (ml.) | $C_{22}$ tracer mg. | Methyl Palmitate mg. | % | Methyl Stearate mg. | % | Methyl Oleate mg. | % | Methyl Linoleate mg. | % | Methyl Linoleate mg. | % |
|---|---|---|---|---|---|---|---|---|---|---|---|
| 40 | 0.1 | 0.3 | 17.6 | 0.1 | 5.9 | 0.5 | 29.4 | 0.7 | 41.2 | 0.1 | 5.9 |
| 45 | 4.8 | 4.8 | 16.1 | 2.1 | 7.0 | 9.8 | 32.9 | 12.4 | 41.6 | 0.7 | 2.3 |
| 50 | 13.0 | 8.2 | 15.0 | 3.3 | 6.0 | 16.8 | 30.7 | 24.6 | 45.0 | 1.8 | 3.3 |
| 55 | 16.9 | 7.3 | 14.5 | 2.8 | 5.6 | 14.8 | 29.5 | 23.5 | 46.8 | 1.8 | 3.6 |
| 60 | 16.0 | 7.6 | 13.9 | 2.8 | 5.1 | 15.4 | 28.2 | 26.7 | 48.8 | 2.2 | 4.0 |
| 65 | 7.4 | 4.8 | 13.2 | 1.7 | 4.7 | 10.0 | 27.5 | 18.3 | 50.4 | 1.5 | 4.1 |
| 70 | 3.1 | 3.3 | 12.9 | 1.2 | 4.7 | 7.0 | 27.3 | 13.0 | 50.8 | 1.1 | 4.3 |
| 75 | 1.1 | 2.9 | 11.5 | 1.1 | 4.3 | 6.6 | 26.1 | 13.5 | 53.4 | 1.2 | 4.7 |
| 80 | 0.3 | 2.1 | 11.2 | 0.8 | 4.3 | 4.7 | 25.1 | 10.1 | 54.0 | 1.0 | 5.3 |
| 85 | 0.1 | 1.5 | 10.5 | 0.5 | 3.5 | 3.5 | 24.5 | 8.0 | 55.9 | 0.8 | 5.6 |
| 90 | | 0.7 | 10.1 | 0.2 | 2.9 | 1.6 | 23.2 | 4.0 | 58.0 | 0.4 | 5.8 |
| 95 | | 0.5 | 9.3 | 0.2 | 3.7 | 1.2 | 22.2 | 3.1 | 57.4 | 0.4 | 7.4 |
| 100 | | 0.4 | 8.7 | 0.1 | 2.2 | 1.0 | 21.7 | 2.8 | 60.9 | 0.3 | 6.5 |
| 105 | | 0.3 | 8.1 | 0.1 | 2.7 | 0.7 | 18.9 | 2.3 | 62.2 | 0.3 | 8.1 |
| 110 | | 0.2 | 7.4 | | | 0.5 | 18.5 | 1.8 | 66.7 | 0.2 | 7.4 |
| 115 | | 0.2 | 8.7 | | | 0.4 | 17.4 | 1.5 | 65.2 | 0.2 | 8.7 |
| 120 | | 0.1 | 5.3 | 0.1 | 5.3 | 0.3 | 15.8 | 1.2 | 63.2 | 0.2 | 10.5 |
| 125 | | 0.1 | 6.7 | | | 0.2 | 13.3 | 1.0 | 66.7 | 0.2 | 13.3 |

Note:
(1) the mg. values were determined using a gas chromatograph with internal standard and weight calculation capabilities.

The percentage of methyl palmitate, methyl stearate and methyl oleate for the fractions was higher than that for the original feed in the beginning of the test and gradually decreased to a value less than for the original feed. The percentage of methyl linoleate and methyl linolenate showed the opposite effect. This change is percentage composition of the fraction is indicative of a separation based on increasing unsaturation (higher Iodine Value) in the molecules being held more tightly on the column. This separation was the basis for the demonstration unit run described in detail in Example V.

EXAMPLE II

The feed was refined, bleached and deodorized regular safflower oil (essentially free of wax and free fatty acids) which, when converted to methyl ester mixture which is analyzed by gas chromatography gives the following composition on a weight basis: 7% methyl palmitate, 3% methyl stearate, 12% methyl oleate, 77% methyl linoleate and 1% other.

The adsorbent for the test was Amberlyst XN1010 (a macroporous, styrene-divinylbenzene sulfonic acid cation exchange resin manufactured by Rohm & Haas), screened to through 20 and on 40 mesh (U.S. Sieve Series), having its exchangeable cation substituents consisting of 50% silver substituents (valence state of one) and 50% sodium substituents. The resin adsorbent was prepared by screening resin beads to isolate a through 20 and on 40 mesh fraction, converting such fraction to the sodium form by exchange with an excess of sodium hydroxide, then introducing the desired level of silver by equilibrium contact with silver nitrate solution, then drying in a 105° C. air oven for 12–16 hours.

The solvent for the test consisted by volume of 25% hexane and 75% ethyl acetate. For this solvent bend: $\delta=8.28$, $\delta_D=7.60$, $\delta_P=1.95$ and $\delta_H=2.63$.

The resin adsorbent was dispersed in solvent, allowed to swell, and introduced as a dispersion in swelled form into the column.

The test was run at 70° C.

During the test solvent was pumped continuously through the column at a rate of 2 milliliters per minute. At time zero, a sample pulse of one milliliter, containing approximately 0.075 grams docosane (a linear hydrocarbon tracer) and 0.750 grams regular safflower oil feed mixture dissolved in solvent (25/75 hexane/ethyl acetate) was added by means of the sample coil, into the solvent flow. The 5.0 milliliter equal volume fractions were collected, the triglyceride in each fraction converted to methyl ester mixture and the composition of each mixture analyzed. The results are presented in Table II which follows.

TABLE II

SEPARATION OF REGULAR SAFFLOWER OIL AMBERLYST XN1010 WITH 50% SILVER SUBSTITUTION AND 50% SODIUM SUBSTITUTION BY DEGREE OF UNSATURATION (SEE NOTE BELOW)

| Elution Volume (ml.) | $C_{22}$ Tracer mg. | Methyl Palmitate mg. | % | Methyl Stearate mg. | % | Methyl Oleate mg. | % | Methyl Linoleate mg. | % |
|---|---|---|---|---|---|---|---|---|---|
| 25 | 0.1 | 0.4 | 7.5 | 0.1 | 1.9 | 0.7 | 13.2 | 4.1 | 77.4 |
| 30 | 5.4 | 4.4 | 7.4 | 1.8 | 3.0 | 8.2 | 13.7 | 44.7 | 74.7 |
| 35 | 14.5 | 2.4 | 8.0 | 0.9 | 3.0 | 4.1 | 13.7 | 22.2 | 74.2 |
| 40 | 16.1 | 1.4 | 8.2 | 0.5 | 2.9 | 2.4 | 14.0 | 12.7 | 74.3 |
| 45 | 12.4 | 1.2 | 7.9 | 0.4 | 2.6 | 2.1 | 13.8 | 11.4 | 75.0 |
| 50 | 9.8 | 0.6 | 8.6 | 0.2 | 2.9 | 1.0 | 14.3 | 5.2 | 74.3 |
| 55 | 5.2 | 0.7 | 8.3 | 0.2 | 2.4 | 1.1 | 13.1 | 6.4 | 76.2 |
| 60 | 3.9 | 0.9 | 7.9 | 0.3 | 2.6 | 1.5 | 13.2 | 8.7 | 76.3 |
| 65 | 1.4 | 0.7 | 7.2 | 0.2 | 2.1 | 1.2 | 12.4 | 7.6 | 78.4 |
| 70 | 1.0 | 0.6 | 7.4 | 0.2 | 2.5 | 1.0 | 12.3 | 6.3 | 77.8 |
| 75 | 0.4 | 0.5 | 7.2 | 0.1 | 1.4 | 0.8 | 11.6 | 5.5 | 79.7 |
| 80 | 0.4 | 0.7 | 6.7 | 0.2 | 1.9 | 1.2 | 11.5 | 8.3 | 79.7 |

TABLE II-continued

SEPARATION OF REGULAR SAFFLOWER OIL AMBERLYST XN1010 WITH 50% SILVER SUBSTITUTION AND 50% SODIUM SUBSTITUTION BY DEGREE OF UNSATURATION (SEE NOTE BELOW)

| Elution Volume | $C_{22}$ Tracer | Methyl Palmitate | | Methyl Stearate | | Methyl Oleate | | Methyl Linoleate | |
|---|---|---|---|---|---|---|---|---|---|
| (ml.) | mg. | mg. | % | mg. | % | mg. | % | mg. | % |
| 80 | 0.4 | 0.7 | 6.7 | 0.2 | 1.9 | 1.2 | 11.5 | 8.3 | 79.7 |
| 85 | 0.1 | 0.3 | 5.6 | 0.1 | 1.9 | 0.6 | 11.1 | 4.4 | 81.5 |
| 90 | 0.1 | 0.1 | 4.2 | — | — | 0.3 | 12.5 | 2.0 | 83.3 |
| 95 | | 0.3 | 6.8 | 0.1 | 2.3 | 0.5 | 11.4 | 3.5 | 79.5 |
| 100 | | 0.4 | 6.2 | 0.1 | 1.5 | 0.7 | 10.8 | 5.3 | 81.5 |
| 105 | | 0.2 | 6.5 | — | — | 0.3 | 9.7 | 2.6 | 83.9 |
| 110 | | 0.2 | 4.4 | 0.1 | 2.2 | 0.5 | 11.1 | 3.7 | 82.2 |
| 115 | | 0.3 | 5.9 | 0.1 | 2.0 | 0.5 | 9.8 | 4.2 | 82.4 |
| 120 | | 0.2 | 4.5 | | | 0.4 | 9.1 | 3.8 | 86.4 |
| 125 | | 0.2 | 4.4 | | | 0.4 | 8.9 | 3.9 | 86.7 |
| 130 | | 0.2 | 4.8 | | | 0.4 | 9.5 | 3.6 | 85.7 |
| 140 | | 0.2 | 5.1 | | | 0.4 | 10.3 | 3.3 | 84.6 |
| 150 | | 0.1 | 3.4 | | | 0.3 | 10.3 | 2.5 | 86.2 |

Note
(1) The mg. values were determined using a gas chromatograph with internal standard and weight calculation capabilities.

The data in Table II indicate separation according to degree of unsaturation (Iodine Value). The methyl linoleate composition for the fractions later in the run indicate the obtaining in those fractions of significantly higher percentages of trilinolein than in the feed.

EXAMPLE III

The feed material was refined and bleached palm oil which, when converted to methyl esters and analyzed by gas chromatography, consisted by weight (total fatty acid methyl ester basis) of 46% methyl palmitate, 4% methyl stearate, 39% methyl oleate, 10% methyl linoleate and 1% other.

The procedure, conditions, solvent and adsorbent for this pulse test run were otherwise the same as for Example II.

The results for this run are presented in Table III which follows.

The above data indicate a fractionation according to Iodine Value.

EXAMPLE IV

The feed material was refined, bleached, deodorized, edible-grade high oleic safflower oil (essentially free of wax and free fatty acids) which, when converted to methyl esters and analyzed by gas chromatography consisted by weight (total fatty acid methyl ester basis) of 5.6% methyl palmitate, 2.3% methyl stearate, 74.0% methyl oleate, 17.4% methyl linoleate, and 0.7% other.

The solvent consisted by volume of 35% hexane and 65% ethyl acetate. For this solvent blend: $\delta=8.08$, $\delta_D=7.56$, $\delta_P=1.69$ and $\delta_H=2.28$.

Otherwise, the procedure, conditions and adsorbent for this pulse test run were the same as for Example II.

The results for this run are presented in Table IV which follows.

TABLE III

SEPARATION OF REFINED, BLEACHED PALM OIL ON AMBERLYST XN1010 WITH 50% SILVER SUBSTITUTION AND 50% SODIUM SUBSTITUTION BY DEGREE OF UNSATURATION (SEE NOTE BELOW)

| Elution Volume | $C_{22}$ Tracer | Methyl Palmitate | | Methyl Stearate | | Methyl Oleate | | Methyl Linoleate | | Calculated |
|---|---|---|---|---|---|---|---|---|---|---|
| (ml.) | mg. | mg. | % | mg. | % | mg. | % | mg. | % | Iodine Value |
| 30 | 0.6 | 4.3 | 50.0 | 0.3 | 3.5 | 3.3 | 38.4 | 0.7 | 8.1 | 47.0 |
| 35 | 4.1 | 14.7 | 47.7 | 1.4 | 4.5 | 12.1 | 39.3 | 2.6 | 8.4 | |
| 40 | 9.2 | 17.1 | 47.9 | 1.6 | 4.5 | 14.0 | 39.2 | 3.0 | 8.4 | |
| 45 | 8.5 | 11.1 | 49.1 | 0.9 | 4.0 | 8.6 | 38.1 | 2.0 | 8.8 | 48.0 |
| 50 | 10.6 | 7.9 | 49.1 | 0.6 | 3.7 | 6.2 | 38.5 | 1.4 | 8.7 | |
| 55 | 5.4 | 4.9 | 50.0 | 0.3 | 3.1 | 3.7 | 37.8 | 0.9 | 9.2 | |
| 60 | 6.4 | 8.4 | 45.9 | 0.8 | 4.4 | 7.3 | 39.9 | 1.8 | 9.8 | 51.3 |
| 65 | 3.1 | 7.8 | 45.9 | 0.7 | 4.1 | 6.7 | 39.4 | 1.8 | 10.6 | |
| 70 | 2.7 | 7.1 | 44.9 | 0.7 | 4.4 | 6.3 | 39.9 | 1.7 | 10.8 | |
| 75 | 1.1 | 5.2 | 45.2 | 0.4 | 3.5 | 4.6 | 40.0 | 1.3 | 11.3 | 53.9 |
| 80 | 1.5 | 5.4 | 43.5 | 0.5 | 4.0 | 5.0 | 40.3 | 1.5 | 12.1 | |
| 85 | 0.3 | 2.4 | 42.9 | 0.2 | 3.6 | 2.2 | 39.3 | 0.8 | 14.3 | |
| 90 | 0.5 | 2.8 | 42.4 | 0.2 | 3.0 | 2.7 | 40.9 | 0.9 | 13.6 | 58.7 |
| 95 | 0.1 | 1.8 | 41.9 | 0.1 | 2.3 | 1.8 | 41.9 | 0.6 | 14.0 | 60.3 |

Note
(1) The mg. values were determined using a gas chromatograph with internal standard and weight calculation capabilities.

TABLE IV

SEPARATION OF HIGH OLEIC SAFFLOWER OIL ON AMBERLYST XN1010 WITH 50% SILVER SUBSTITUTION AND 50% SODIUM SUBSTITUTION BY DEGREE OF UNSATURATION

| Elution Volume | $C_{22}$ Tracer | Methyl Palmitate | | Methyl Stearate | | Methyl Oleate | | Methyl Linoleate | | Calculated |
|---|---|---|---|---|---|---|---|---|---|---|
| (ml.) | mg. | mg. | % | mg. | % | mg. | % | mg. | % | Iodine Value |
| 30 | 0.5 | 0.8 | 6.1 | 0.3 | 2.3 | 10.4 | 79.4 | 1.6 | 12.2 | 89 |
| 35 | 4.1 | 2.8 | 5.8 | 1.2 | 2.5 | 37.2 | 77.5 | 6.6 | 13.8 | |
| 40 | 8.7 | 1.8 | 5.9 | 0.8 | 2.6 | 23.9 | 77.9 | 4.1 | 13.4 | |
| 45 | 11.8 | 1.9 | 6.0 | 0.8 | 2.5 | 24.5 | 77.5 | 4.3 | 13.6 | |
| 50 | 10.9 | 1.3 | 5.9 | 0.5 | 2.3 | 17.0 | 77.6 | 3.0 | 13.7 | |

TABLE IV-continued

SEPARATION OF HIGH OLEIC SAFFLOWER OIL ON AMBERLYST XN1010 WITH 50% SILVER SUBSTITUTION AND 50% SODIUM SUBSTITUTION BY DEGREE OF UNSATURATION

| Elution Volume | $C_{22}$ Tracer | Methyl Palmitate | | Methyl Stearate | | Methyl Oleate | | Methyl Linoleate | | Calculated |
|---|---|---|---|---|---|---|---|---|---|---|
| (ml.) | mg. | mg. | % | mg. | % | mg. | % | mg. | % | Iodine Value |
| 55 | 7.5 | 1.6 | 5.9 | 0.6 | 2.2 | 21.0 | 76.9 | 4.0 | 14.7 | 92 |
| 60 | 6.8 | 1.7 | 5.9 | 0.7 | 2.4 | 22.1 | 76.5 | 4.3 | 14.9 | |
| 65 | 4.8 | 1.4 | 5.9 | 0.5 | 2.1 | 18.2 | 76.2 | 3.7 | 15.5 | |
| 70 | 3.8 | 1.2 | 5.8 | 0.5 | 2.4 | 15.8 | 76.0 | 3.2 | 15.4 | |
| 75 | 1.9 | 0.9 | 5.6 | 0.3 | 1.9 | 12.1 | 75.6 | 2.6 | 16.3 | |
| 80 | 1.3 | 0.7 | 5.4 | 0.3 | 2.3 | 9.6 | 74.4 | 2.2 | 17.1 | 94 |
| 85 | 0.6 | 0.6 | 5.6 | 0.2 | 1.9 | 7.9 | 73.8 | 1.9 | 17.8 | |
| 90 | 0.5 | 0.5 | 5.1 | 0.2 | 2.0 | 7.3 | 73.7 | 1.9 | 19.2 | |
| 95 | 0.2 | 0.3 | 4.7 | 0.1 | 1.6 | 4.7 | 73.4 | 1.3 | 20.3 | |
| 100 | 0.3 | 0.3 | 4.7 | 0.1 | 1.6 | 4.7 | 73.4 | 1.3 | 20.3 | |
| 105 | 0.1 | 0.3 | 5.9 | 0.1 | 2.0 | 3.6 | 70.6 | 1.1 | 21.6 | 98 |
| 110 | 0.1 | 0.2 | 5.0 | 0.1 | 2.5 | 2.8 | 70.0 | 0.9 | 22.5 | |
| 115 | | 0.2 | 5.6 | | | 2.5 | 69.4 | 0.9 | 25.0 | |
| 120 | 0.1 | 0.2 | 5.3 | 0.1 | 2.6 | 2.6 | 68.4 | 0.9 | 23.7 | 100 |

The data in the above table show a fractionation according to unsaturation (Iodine Value). The highest levels of oleic (presumably triolein) are present in the first fractions. Thus, this example demonstrates the fractiontion of high oleic safflower oil to obtain fraction of increased oleic (triolein) content.

When in the tests of the Examples I–IV, an equivalent amount of copper is substituted for the silver as the $\pi$-complexing substituent, results are obtained indicating the attainment of fractionation according to Iodine Value.

When in the tests of Examples I–IV, an equivalent amount of potassium, barium, calcium or magnesium is substituted for the sodium substituents of the resin adsorbent, results are obtained indicating the attainment of fractionation according to Iodine Value.

EXAMPLE V

This example illustrates separation of soybean oil triglycerides into two fractions, a first fraction containing a substantially reduced percentage of triglyceride with linolenic acid moiety and a second fraction containing the remainder of the feed mixture. The run of this example is carried out in the demonstration unit described above operated in accordance with the continuous simulated moving bed mode described above in conjunction with the description of the demonstration unit.

The refined, bleached and deodorized soybean oil feed composition (on a fatty methyl ester basis) is particularly disclosed in Table V below.

The resin adsorbent and solvent are those described in Example I above.

The controller and valves of the demonstration unit are set so that the desorption zone includes two columns, the purification zone includes 8 columns and the adsorption zone includes 12 columns.

The step time (the interval at which the flow pattern is advanced one column) is 6 minutes.

The feed rate is 1.0 ml. per minute. The solvent introduction rate is 30 ml. per minute. The extract flow is 18.9 ml./minute. The raffinate flow is 13.9 ml./minute. The conditions were not steady state conditions; thus, the outflow was greater than the inflow during the period considered.

The temperature of operation is 70° C.

Results are shown in Table V below. In that table, percentages are given on a fatty methyl ester basis. In Table V, R stands for raffinate and E stands for extract.

TABLE V

REDUCTION OF PERCENTAGE OF LINOLENIC ACID MOIETY IN SOYBEAN OIL FEED USING DEMONSTRATION UNIT (CONTINUOUS MOVING BED PROCESS)

| Feed Production Period | Methyl Palmitate 10 % in R/% in E | Methyl Stearate 4 % in R/% in E | Methyl Oleate 23 % in R/% in E | Methyl Linoleate 55 % in R/% in E | Methyl Linoleate 8 % in R/% in E | Calculated Iodine Value 142 R/E |
|---|---|---|---|---|---|---|
| 17 | 15.1/7.5 | 6.1/1.9 | 28.5/16.3 | 43.9/61.9 | 6.4/12.4 | 117/153 |
| 18 | 15.9/16.1 | 5.9/1.6 | 29.0/14.8 | 43.7/62.8 | 5.5/14.8 | 115/160 |
| 19 | 15.2/4.5 | 5.7/0.9 | 29.8/11.7 | 45.3/63.9 | 4.0/19.1 | 114/170 |
| 20 | 13.3/5.0 | 4.6/1.2 | 27.7/12.7 | 50/63.1 | 4.4/18.1 | 122/167 |
| 21 | 13.3/3.5 | 4.7/0.9 | 27.7/10.6 | 49.9/64.4 | 4.4/20.6 | 122/174 |

The above Table V indicates, for example, that for production period 19, the raffinate triglycerides consisted by weight on a fatty acid methyl ester basis of 15.2% methyl palmitate, 5.7% methyl stearate, 29.8% methyl oleate, 45.3% methyl linoleate and 4% methyl linolenate and have an Iodine Value of 114 and that the extract triglycerides consisted by weight on a fatty acid methyl ester basis of 4.5% methyl palmitate, 0.9% methyl stearate, 11.7% methyl oleate, 63.9% methyl linoleate and 19.1% methyl linolenate and have a Iodine Value of 170. The data in Table V indicates that for production periods 19, 20 and 21, raffinate triglyceride compositions were obtained containing on a fatty methyl ester basis methyl palmitate at percentages of 4.0%, 4.4% and 4.4% (compared to 8% for the feed) and Iodine Values of 114, 122 and 122 (compared to 142 for the feed). Thus, the object of significant reduction in content of triglyceride with linolenic acid moiety is obtained as well as significant reduction in Iodine Value (both compared to the feed). Analysis on raffinate and extract triglyceride for production period 19 indicates a trans content identical to that in the feedstock.

When a solvent consisting by volume of 45% hexane and 55% acetone (for this solvent blend: $\delta=8.20$, $\delta_D=7.47$, $\delta_P=2.81$, and $\delta_H=1.87$) is substituted for the hexane/ethyl acetate solvent in Example V, similarly good linolenic acid moiety content and Iodine Values are obtained.

When a solvent consisting by volume of 75% diethyl ether and 25% ethyl acetate (for this solvent blend: $\delta=8.02$, $\delta_D=7.25$, $\delta_P=1.70$, and $\delta_H=2.98$) is substituted for the hexane/ethyl acetate solvent in Example V, similarly good linolenic acid moiety content and Iodine Values are obtained.

When Zeolite X or Zeolite Y or silvered Zeolite X or silvered Zeolite Y is substitued for the adsorbent in the run of Example V, essentially no fractionation on the basis of Iodine Value is obtained. This is due at least in part to inferior dynamic capacity.

When in the above Examples I–V, the resin adsorbent is derived from Amberlyst 15 or Amberlyst XN1005 or MSC-1 instead of from Amberlyst XN1010, similar separations are obtained.

EXAMPLE VI 54 mg. of soybean oil (containing by weight fatty acid moieties on a fatty methyl ester basis as follows: palmitic, 9.7%; stearic, 4.6%; oleic, 23.2%; linoleic, 53.9%; linolenic, 7.7%; other, 0.9%) was added to 5 milliliters of hexane ($\delta=7.3$, $\delta_D=7.3$, $\delta_P=0$, and $\delta_H=0$) and 1.0 gram Amberlyst 15 ion exchange resin with 100% of its cationic substituents being silver substituents, in a screw-cap vial. This was placed on a wrist action shaker at 27° C. overnight. A 1.0 milliliter aliquot of the supernatant liquid was removed, freed of hexane with a nitrogen stream, weighed, multiplied by 5 to give 35.5 mg. in the bulk liquid and by difference 18.5 mg. adsorbed. The bulk liquid material was converted to methyl esters with sodium methoxide/methanol, the resulting ester mixture analyzed by gas chromatography and selectivities were calculated according to the aforementioned formula using methyl esters as the components M and N. These selectivities were as follows: methyl stearate/methyl palmitate, 0.4; methyl oleate/methyl palmitate, 1.5; methyl linoleate/methyl palmitate, 5.2; and methyl linolenate/methyl palmitate, 42.4. These selectivities demonstrate that triglycerides of higher Iodine Value were preferably adsorbed and that a soybean oil fraction was produced with dramatically reduced linolenic acid moiety content.

EXAMPLE VII

Soybean oil (same analysis as in Example VI), 200.4 mg., was added to 5.0 milliliters of hexane and 1.0 gram of Amberlyst XN1010 resin having its cationic substituents consisting of 25% silver substituents and 75% sodium substituents in a screw-cap vial. This was placed on a wrist action shaker at 38° C. for 15 hours. A 1.0 milliliter aliquot was removed, freed of hexane with a nitrogen stream, weighed, the weight multiplied by 5 to give 52.5 mg. in the unadsorbed triglyceride fraction and 147.9 mg. triglyceride in the adsorbed fraction. The unadsorbed fraction was converted to methyl ester, and the resulting methyl ester mixture analyzed by gas chromatography, and selectivities were calculated as in Example VI, The selectivities were as follows: methyl stearate/methyl palmitate, 1.1; methyl oleate/methyl palmitate, 1.5; methyl linoleate/methyl palmitate, 2.4; methyl linolenate/methyl palmitate, 6.5. This figures indicate separation of the soybean oil into fractions based on Iodine Value.

EXAMPLE VIII

Soybean oil (containing by weight fatty acid moieties on a fatty methyl ester basis as follows: palmitic, 10.7%; stearic, 3.9%; oleic, 22.8%; linoleic, 55.1%; and linolenic, 7.5%), 57.3 mg., was added to 5.0 milliliters of solvent (90% by volume hexane and 10% by volume ethyl acetate; for this solvent blend: $\delta=7.35$, $\delta_D=7.34$, $\delta_P=0.26$, and $\delta_H=0.35$) and 1.0 gram of Amberlyst XN1010 having its cationic substituents consisting of 50% silver substituents and 50% sodium substituents, in a screw-cap vial. This was placed on a wrist action shaker at 70° C. for 2 hours. A 1.0 milliliter aliquot was removed, freed of solvent with a nitrogen stream, weighed, multiplied by 5 to give 11.4 mg. of unadsorbed triglyceride and 45.9 mg. of adsorbed triglyceride. The former was converted to methyl esters and the resulting ester mixture analyzed by gas chromatography. Selectivities were calculated as in Example VI to give the following results: methyl stearate/methyl palmitate, 0.9; methyl oleate/methyl palmitate, 1.5; methyl linoleate/methyl palmitate, 3.0; methyl linolenate/methyl palmitate, 5.1. These results indicate separation of soybean oil was obtained according to Iodine Value.

EXAMPLE IX

The feed consisted by weight of 16% tristearin, 42% triolein, and 42% trilinolein.

The absorbent used was Amberlyst XN1010 (a macroporous, styrene-divinylbenzene sulfonic acid cation exchange resin manufactured by Rohm & Haas) screened to through 40 and on 50 mesh (U.S. Sieve Series), having its exchangeable cation substituents consisting of 50% silver substituents (valence state of one) and 50% sodium substituents.

The solvent used first consisted by volume of 90% hexane and 10% ethyl acetate (for this solvent blend: $\delta=7.35$, $\delta_D=7.34$, $\delta_P=0.26$, and $\delta_H=0.35$); this solvent is denoted Solvent I below. The solvent used second consisted by volume of 80% hexane and 20% ethyl acetate (for this solvent blend: $\delta=7.43$, $\delta_D=7.38$, $\delta_P=0.52$, $\delta_H=0.7$); this solvent is denoted Solvent II below. The solvent used third consisted by volume of 50% hexane and 50% ethyl acetate (for this solvent blend: $\delta=7.81$, $\delta_D=7.50$, $\delta_P=1.30$, and $\delta_H=1.75$); this solvent is denoted Solvent III below. The solvent used fourth consisted by volume of 100% ethyl acetate ($\delta=8.85$, $\delta_D=7.70$, $\delta_P=2.60$, $\delta_H=3.50$); this solvent is denoted Solvent IV below. The solvent used fifth (i.e. last) consisted by volume of 80% ethyl acetate and 20% methanol (for this solvent blend: $\delta=9.72$, $\delta_D=7.64$, $\delta_P=3.28$, and $\delta_H=4.99$); this solvent is denoted Solvent V below.

The test was run at 50° C.

Solvent I was pumped through the "pulse test" column described above at 2.0 ml./minute. With flow stopped, a "pulse" of 10 ml. containing 2.0 grams (95% feed and 5% $C_{22}$ linear hydrocarbon tracer) dissolved in 10 ml. of Solvent I was injected into the column entrance. Flow of Solvent I was then restarted, and eluant sample collection was begun. After approximately two column volumes of Solvent I was pumped, the solvent was changed to Solvent II, then to Solvent III, etc. with approximately two column volumes of each solvent being pumped in succession after the above described feed injection. Eluant samples were collected. Triglyceride in the collected samples was converted to methyl ester which was analyzed by gas chromatrography.

From these analyses, elution concentration curves were plotted.

Table VI which follows presents the data for this run.

TABLE VI

SEPARATION OF MIXTURE OF TRISTEARIN, TRIOLEIN AND TRILINOLEIN USING AMBERLYST XN1010 WITH 50% SILVER SUBSTITUTION AND 50% SODIUM SUBSTITUTION IN A TWO SOLVENT PROCESS

| Solvent | Triglyceride Composition at Elution Peak % Tristearin | % Triolein | % Trilinolein | Calculated Iodine Value |
|---|---|---|---|---|
| Solvent I | 100 | — | — | 0 |
| Solvent II | 86 | 14 | — | 13 |
| Solvent III | — | 100 | — | 90 |
| Solvent IV | — | 88 | 12 | 101 |
| Solvent V | — | 29 | 71 | 155 |

The above data indicates that with a 50% silver substituted—50% sodium substituted resin, to separate unsaturates from saturates (tristearin), the solvent constituting the adsorption vehicle is desirably Solvent I (90% hexane—10% ethyl acetate) and the solvent constituting the desorbent is desirably Solvent III (50% hexane—50% ethyl acetate) if the unsaturates are only monounsaturates (triolein) and Solvent V (80% ethyl acetate—20% methanol) if the unsaturates consist of both mono- and diunsaturates (triolein and trilinolein).

In the adsorption vehicle, diisopropyl ether is readily substituted for the ethyl acetate. Moreover, the desorbents are readily modified to include acetone and/or diisopropyl ether.

EXAMPLE X

The feed consisted by weight of 16% tristearin, 42% triolein and 42% trilinolein.

The adsorbent used was Amberlyst XN1010 (a macroporous, styrene-divinylbenzene sulfonic acid cation exchange resin manufactured by Rohm & Haas) screened to through 40 and on 50 mesh (U.S. Sieve Series), having its exchangeable cation substituents consisting of 25% silver substituents (valence state of one) and 75% sodium substituents.

The solvent used first consisted by volume of 100% hexane ($\delta=7.30$, $\delta_D=7.30$, $\delta_P=0$, $\delta_H=0$); this solvent is denoted Solvent A below. The solvent used second consisted by volume of 95% hexane and 5% ethyl acetate (for this solvent blend: $\delta=7.33$; $\delta_D=7.32$, $\delta_P=0.13$, $\delta_H=0.18$); this solvent is denoted Solvent B below. The solvent used third consisted by volume of 90% hexane and 10% ethyl acetate (for this solvent blend: $\delta=7.35$, $\delta_D=7.34$, $\delta_P=0.26$, and $\delta_H=0.35$); this solvent is denoted Solvent C below. The fourth solvent used consisted by volume of 80% hexane and 20% ethyl acetate (for this solvent blend: $\delta=7.43$, $\delta_D=7.38$, $\delta_P=0.52$, and $\delta_H=0.7$); this solvent is denoted Solvent D below. The fifth solvent used consisted by volume of 70% hexane and 30% ethyl acetate (for this solvent blend: $\delta=7.57$, $\delta_D=7.40$, $\delta_P=0.78$, and $\delta_H=1.05$); this solvent is denoted Solvent E below. The sixth solvent used consisted by volume of 60% hexane and 40% ethyl acetate (for this solvent blend: $\delta=7.70$, $\delta_D=7.46$, $\delta_P=1.04$, $\delta_H=1.40$); this solvent is denoted Solvent F below. The seventh solvent used consisted by volume of 50% hexane and 50% ethyl acetate (for this solvent blend: $\delta=7.81$, $\delta_D=7.50$, $\delta_P=1.30$, and $\delta_H=1.75$); this solvent is denoted Solvent G below. The eighth solvent used consisted by volume of 100% ethyl acetate ($\delta=8.85$, $\delta_D=7.70$, $\delta_P=2.60$, $\delta_H=3.50$); this solvent is denoted Solvent H below.

The test was run at 50° C.

Solvent A was pumped through the "pulse test" column described above at 2.0 ml./minute. With flow stopped, a "pulse" of 10 ml. containing 2.0 grams (95% feed and 5% $C_{22}$ linear hydrocarbon tracer) dissolved in 10 ml. of Solvent A was injected into the column entrance. Flow of Solvent A was then restarted, and eluant sample collection was begun. After approximately two column volumes of Solvent A was pumped, the solvent was changed to Solvent B, then to Solvent C, etc. with approximately two column volumes of each solvent being pumped in succession after the above described feed injection. Eluant samples were collected. Triglyceride in the collected samples was converted to methyl ester which was analyzed by gas chromatrography. From these analyses, elution concentration curves were plotted.

Table VII which follows presents data obtained in this run.

TABLE VII

SEPARATION OF MIXTURE OF TRISTEARIN, TRIOLEIN AND TRILINOLEIN USING AMBERLYST XN1010 WITH 25% SILVER SUBSTITUTION AND 75% SODIUM SUBSTITUTION IN A TWO SOLVENT PROCESS

| Solvent | Triglyceride Composition at Elution Peak % Tristearin | % Triolein | % Trilinolein | Calculated Iodine Value |
|---|---|---|---|---|
| Solvent A | 100 | — | — | 0 |
| Solvent B | 100 | — | — | 0 |
| Solvent C | 30 | 70 | — | 63 |
| Solvent D | 3 | 91 | 6 | 93 |
| Solvent E | — | 65 | 35 | 122 |
| Solvent F | — | 47 | 53 | 138 |
| Solvent G | — | 41 | 59 | 144 |
| Solvent H | 1 | 25 | 74 | 156 |

The above data indicates that with a 25% silver substituted-75% sodium substituted resin, to separate unsaturates from saturates (tristearin), the solvent constituting the adsorption vehicle is desirably Solvent A (100% hexane) and the solvent constituting the desorbent is desirably Solvent D (80% hexane—20% ethyl acetate) if the unsaturates are only monounsaturates (triolein) and Solvent H (100% ethyl acetate) if the unsaturates consist of both mono- and diunsaturates (triolein and trilinolein).

When in the above Examples X and XI, the resin adsorbent is derived from Amberlyst 15 or Amberlyst XN1005 or MSC-1 instead of from Amberlyst XN1010, similar separation data is obtained.

While the foregoing describes certain preferred embodiments of the invention, modifications will be readily apparent to those skilled in the art. Thus, the scope of the invention is intended to be defined by the following claims.

What is claimed is:

1. A process for separating a mixture of triglycerides with different Iodine Values and having their carboxylic acid moieties containing from 6 to 26 carbon atoms, to produce fractions of higher Iodine Value and lower Iodine Value, said process comprising the steps of (a) contacting a solution of said mixture in solvent with macroreticular strong acid cation exchange resin to selectively adsorb triglyceride of higher Iodine Value and to leave in solution a fraction of said mixture enriched in content of triglyceride of lower Iodine Value, (b) removing solution of fraction enriched in content of triglyceride of lower Iodine Value from contact with resin which has selectively adsorbed triglyceride of higher Iodine Value, (c) contacting resin which has selectively adsorbed triglyceride of higher Iodine Value with solvent to cause desorption of adsorbed triglyceride and provide a solution in solvent of fraction enriched in content of trigylceride of higher Iodine Value, (d) removing solution of fraction enriched in content of triglyceride of higher Iodine Value from contact with resin;

the solvent in step (a) and the solvent in step (c) being of the same or of different composition and being characterized by a solubility parameter (on a 25° C. basis) ranging from about 7.0 to about 15.0, a solubility parameter dispersion component (on a 25° C. basis) ranging from about 7.0 to about 9.0, a solubility parameter polar component (on a 25° C. basis) ranging from 0 to about 6.0 and a solubility parameter hydrogen bonding component (on a 25° C. basis) ranging from 0 to about 11.5; said resin having its exchangeable cation substituents consisting essentially of from about 3% to 100% of metal cation substituents capable of forming $\pi$ complexes, the balance being metal ions incapable of forming $\pi$ compexes; the solvent in step (a) and the solvent in step (c) and the percentage of metal cation substituents capable of forming $\pi$ complexes being selected to provide selectivity in step (a) and desorption in step (c).

2. A process as recited in claim 1, in which the solvent in each step has the same composition and is characterized by a solubility parameter (on a 25° C. basis) ranging from about 7.0 to about 10.5, a solubility parameter dispersion component (on a 25° C. basis) ranging from about 7.0 to about 9.0, a solubility parameter polar component (on a 25° C. basis) ranging from about 0.2 to about 5.1 and a solubility parameter hydrogen bonding component (on a 25° C. basis) ranging from about 0.3 to about 7.4.

3. A process as recited in claim 2, in which said resin has its exchangeable cation substituents consisting essentially of from about 20% to about 60% metal cation substituents capable of forming $\pi$ complexes; and in which said $\pi$-complexing substituents are selected from the group consisting of silver and copper in the valence state of one and platinum and palladium in the valance state of two; and in which the cation substituents which are not capable of forming $\pi$ complexes are selected from the group consisting of sodium, potassium, barium, calcium and magnesium.

4. A process as recited in claim 3, in which the metal cation substituents capable of forming $\pi$ complexes are silver in a valance state of one and the remainder of the exchangeable cation substituents are sodium substituents.

5. A process as recited in claim 4, which is carried out by a continuous simulated moving bed technique.

6. A process as recited in claim 5, in which the mixture of triglycerides which is separated is refined, bleached and deoderized soybean oil containing from about 6.5% to about 8.5% by weight linolenic acid moiety (on a fatty methyl ester basis) and having an Iodine Value ranging from about 130 to about 150 and in which the fraction obtained in step (b) contains from 0% to about 5% by weight linolenic acid moiety (on a fatty methyl ester basis) and has a Iodine Value ranging from about 80 to about 125.

7. A process as recited in claim 6, in which the solvent consists essentially by volume of from about 15% to about 40% hexane with the remainder being ethyl acetate.

8. A process as recited in claim 4, in which the mixture of trigylcerides being separated is regular safflower oil.

9. A process as recited in claim 4, in which the mixture of triglycerides being separated is high oleic safflower oil.

10. A process as recited in claim 4, in which the mixture of triglycerides being separated is palm oil.

11. A process as recited in claim 4, in which the solvent is characterized by a solubility parameter (on a 25° C. basis) ranging from about 7.4 to about 9.0, a solubility parameter dispersion component (on a 25° C. basis) ranging from about 7.25 to about 8.0, a solubility parameter polar component (on a 25° C. basis) ranging from about 0.5 to about 3.0 and a solubility parameter hydrogen bonding component (on a 25° C. basis) ranging from about 0.7 to about 4.0.

12. A process as recited in claim 1, in which the solvent in step (a), the adsorption vehicle, has a different composition from the solvent in step (c), the desorbent.

13. A process as recited in claim 12, in which the adsorption vehicle is characterized by a solubility parameter (on a 25° C. basis) ranging from about 7.3 to about 14.9, a solubility parameter dispersion component (on a 25° C. basis) ranging from about 7.3 to about 9.0, a solubility parameter polar component (on a 25° C. basis) ranging from 0 to about 5.7, and a solubility parameter hydrogen bonding component (on a 25° C. basis) ranging from 0 to about 11.0; in which the desorbent is characterized by a solubility parameter (on a 25° C. basis) ranging from about 7.4 to about 15.0 and at least 0.1 greater than that of the adsorption vehicle, a solubility parameter dispersion component (on a 25° C. basis) ranging from about 7.3 to about 9.0, a solubility parameter polar component (on a 25° C. basis) ranging from about 0.3 to about 6.0 and at least 0.3 greater than that of the adsorption vehicle, and a solubility parameter hydrogen bonding component (on a 25° C. basis) ranging from about 0.5 to about 11.5 and at least 0.5 greater than that of the adsorption vehicle.

14. A process as recited in claim 13, in which said resin has its exchangeable cation substituents consisting essentially of from about 20% to about 60% metal cation substituents capable of forming $\pi$ complexes; and in which said $\pi$-complexing substituents are selected from the group consisting of silver and copper in the valence state of one and platinum and paladium in the valence state of two; and in which the cation substituents which are not capable of forming $\pi$ complexes are selected from the group consisting of hydrogen, sodium, potassium, barium, calcium and magnesium.

15. A process as recited in claim 14 in which the metal cation substituents capable of forming $\pi$ complexes are silver substituents in a valence state of one and the remainder of the exchangeable cation substituents are sodium substituents.

16. A process as recited in claim 15, in which the adsorption vehicle is characterized by a solubility parameter (on a 25° C. basis) ranging from about 7.3 to about 9.0, a solubility parameter dispersion component (on a 25° C. basis) ranging from about 7.3 to about 8.0, a solubility parameter polar component (on a 25° C.

basis) ranging from 0 to about 2.7, and a solubility parameter hydrogen bonding component (on a 25° C. basis) ranging from 0 to about 3.6; and in which the desorbent is characterized by a solubility parameter (on a 25° C. basis) ranging from about 7.4 to about 10.0, a solubility parameter dispersion component (on a 25° C. basis) ranging from about 7.3 to about 8.0, a solubility parameter polar component (on a 25° C. basis) ranging from about 0.5 to about 4.0 and a solubility parameter hydrogen bonding component (on a 25° C. basis) ranging from about 0.5 to about 6.0.

17. A process as recited in claim 16 in which the adsorption vehicle comprises hexane and in which the desorbent comprises ethyl acetate.

* * * * *

UNITED STATES PATENT AND TRADEMARK OFFICE

CERTIFICATE OF CORRECTION

PATENT NO. : 4,297,292

DATED : October 27, 1981

INVENTOR(S) : Ted J. Logan and Timothy A. Lubsen

It is certified that error appears in the above-identified patent and that said Letters Patent are hereby corrected as shown below:

Col. 7, line 10, after "dissolving" insert -- phase during --

Col. 10, lines 41 and 42, "adsorpttion" should be -- adsorption --

Col. 12, line 62, after "(adsorption" insert -- , --

Col. 13, line 19, after "(in" and before "words," insert -- other --

Col. 15, Table I, in heading over columns 11 and 12 (the last two columns), "Linoleate" should be -- Linolenate --

Col. 16, line 34, "bend" should be -- blend --

UNITED STATES PATENT AND TRADEMARK OFFICE

CERTIFICATE OF CORRECTION

PATENT NO. : 4,297,292

DATED : October 27, 1981

INVENTOR(S) : Ted J. Logan and Timothy A. Lubsen

It is certified that error appears in the above-identified patent and that said Letters Patent are hereby corrected as shown below:

Col. 20, Table V, in heading over sixth column, "Linoleate" should be -- Linolenate --

Col. 20, Table V, second column, figure shown for "% in E" for "Feed Production Period 18", delete "16.1" and insert -- 6.1 --

Col. 21, line 45, "preferably" should be -- preferentially --

Signed and Sealed this

***Thirtieth* Day of *March 1982***

[SEAL]

*Attest:*

GERALD J. MOSSINGHOFF

*Attesting Officer*

*Commissioner of Patents and Trademarks*